(12) United States Patent
Curatoli et al.

(10) Patent No.: US 12,323,015 B2
(45) Date of Patent: Jun. 3, 2025

(54) APPARATUS FOR THE ASSEMBLY OF LAMELLAR PACKS FOR ELECTRICAL USE

(71) Applicant: CORRADA S.P.A., Lainate (IT)

(72) Inventors: Alberto Curatoli, Rho (IT); Davide Verri, Inveruno (IT); Gianluca Bertocchi, Rho (IT)

(73) Assignee: Corrado S.P.A., Lainate (IT)

( * ) Notice: Subject to any disclaimer, the term of this patent is extended or adjusted under 35 U.S.C. 154(b) by 411 days.

(21) Appl. No.: 17/774,218

(22) PCT Filed: Oct. 30, 2020

(86) PCT No.: PCT/IB2020/060225
§ 371 (c)(1),
(2) Date: May 4, 2022

(87) PCT Pub. No.: WO2021/090134
PCT Pub. Date: May 14, 2021

(65) Prior Publication Data
US 2022/0407400 A1  Dec. 22, 2022

(30) Foreign Application Priority Data

Nov. 4, 2019  (IT) .................. 102019000020286

(51) Int. Cl.
*H02K 15/02*    (2025.01)
*B05C 1/02*     (2006.01)
*B05C 11/10*    (2006.01)
*B21D 28/02*    (2006.01)
*H01F 41/02*    (2006.01)

(52) U.S. Cl.
CPC ............. *H02K 15/02* (2013.01); *B05C 1/025* (2013.01); *B05C 11/1034* (2013.01); *B21D 28/02* (2013.01); *H01F 41/0206* (2013.01)

(58) Field of Classification Search
CPC ..... B05C 1/025; B05C 11/1034; B21D 28/02; H01F 41/0206; H02K 15/02; H02K 15/12; B32B 15/01; B32B 15/011; B29C 65/00; B29C 65/48; B29C 65/52; B29C 65/524;
(Continued)

(56) References Cited

U.S. PATENT DOCUMENTS

2016/0023447 A1* 1/2016 Shimizu ................. H02K 15/02
156/247

FOREIGN PATENT DOCUMENTS

CN  107533907 A  1/2018
EP  3021466 A2   5/2016
(Continued)

*Primary Examiner* — Philip C Tucker
*Assistant Examiner* — Brian R Slawski
(74) *Attorney, Agent, or Firm* — Dickinson Wright PLLC; Andrew D. Dorisio

(57) ABSTRACT

An apparatus (10) for the assembly of lamellar packs for electrical use in electric motor machines, generators, transformers, counters, ignition coils and similar electrical equipment by gluing, comprising a die-cutting station (12) for die-cutting a sheet (15) to define strips (15') to be superimposed one on the other to define a lamellar pack and a station (14) for gluing—by means of glue—said strips (15') sheared from said sheet (15) and comprising means for the discrete application of an amount of glue on a surface of the sheet (15) and with said means operating synchronously with the advancement of the sheet (15) in the die-cutting station (12).

10 Claims, 2 Drawing Sheets

(58) Field of Classification Search
CPC ......... B29C 66/00; B29C 66/21; B29C 66/40; B29C 66/41; B29C 66/43
USPC ......... 156/60, 250, 256, 264, 290, 291, 349, 156/510, 512, 538, 539, 556, 558, 559, 156/563, 566, 578; 29/729, 732, 738
See application file for complete search history.

(56) References Cited

FOREIGN PATENT DOCUMENTS

| | | |
|---|---|---|
| JP | 2015076970 A | 4/2015 |
| JP | 2017216873 A | 12/2017 |

* cited by examiner

APPARATUS FOR THE ASSEMBLY OF LAMELLAR PACKS FOR ELECTRICAL USE

TECHNICAL FIELD

The present invention relates to an apparatus for the assembly of lamellar packs for electrical use.

BACKGROUND

More particularly, the present invention relates to an apparatus for the assembly of lamellar packs for electrical use, i.e. magnetic strips packed or superimposed one with respect to the other for use in electric motor machines, generators, transformers, counters, ignition coils and similar electrical equipment.

As known, electric machines such as, for example, electric motors or transformers or the like, comprise magnetic circuits made of a lamellar structure, i.e. consisting of a plurality of thin metal strips or plates of various shapes and sizes as a function of the specific magnetic requirements desired, superimposed and constrained to each other to define a so-called "lamellar pack".

Said "lamellar packs" are obtained by superimposing the strips by placing them in direct contact with each other without the presence, between said superimposed strips, of intermediate air spaces which can generate the so-called "spring effect" which causes a deterioration of the electrical properties and, at the same time, it also affects the dimensional and mechanical characteristics of the electric machine comprising the lamellar pack.

The lamellar packs are conventionally obtained by superimposing and connecting the single strips which are for example obtained starting from cutting dies which form the strips by means of a punch and, for example, starting from a web sheet or by means of a laser cutting in another known way and with said strips which, after the forming, can be superimposed and connected to each other on the machine that forms the single strip or they may be superimposed and connected to each other on other assembly machines.

Said strips may be connected to each other by means of coupling or engagement components called "staples" which are obtained by deforming said strips in specifically selected positions and with said components of the strip which, during coupling, they are introduced or forced into corresponding recessed portions of an underlying strip to form, by successive superimpositions, the pack of strips.

Alternatively, to the above-described method of constraint with the "staples", the strips can be packed and constrained to each other by means of bosses formed on the surface of the strips.

According to a further known manufacturing technique, the strips can be packed and constrained to each other by means of glue or by means of other rigid constraint means of the known type.

A known technique for assembling lamellar packs by means of glue provides for the use of pressure nozzles connected to a glue pumping system (typically of the biocomponent type) which is then applied on the sheet to be cut at the input of the die; more particularly, the glue is applied by means of sprayers and nozzles with a first component of the glue which is applied at points on an upper layer of the sheet and with the second component which is likewise applied at points on the lower layer of the sheet; gluing occurs in a sheet detachment station by adhering the upper part of the strip with the first layer of glue with the lower side of a subsequent strip covered with the second component of the glue.

Another technical note for the assembly of lamellar packs by means of glue (of the bicomponent type) provides for the use of nozzles with the first component of the glue applied by sprayers to the input of the cutting die and with the second component of the glue applied in a special and dedicated station arranged in the lower part of the cutting die; also in this case the lamellar pack is formed by making the strip adhere with the layer of the first glue component with a subsequent strip provided with the second glue component.

Among the known solutions CN107533907 describes an apparatus for forming lamellar packs for electrical use, by means of which—on the sheet from which the single strips are obtained (by means of progressive cutting)—a layer of glue is applied both on the upper surface and on the lower surface of the sheet, with said layers of glue applied by means of coating/spreading devices arranged above and below the sheet and operating after the drilling step or station and before the cutting step or station in the die which forms the lamellar pack.

JP2017216873 describes an apparatus for making lamellar packs for electrical use wherein the strips which form the pack are joined by gluing with the layer of adhesive material which is applied without synchronising with the vertical cutting movement speed of the cutting die.

A further known embodiment is described in EP3021466 and it refers to a method for forming lamellar packs for electrical use by means of an adhesive applied by means of an application head and wherein the strip is rotated around the vertical axis thereof so that the head can apply the adhesive on the entire surface of the strip or, alternatively, with the application head rotating around the axis of the strip to apply the glue on the surface of said strip.

Another solution known and described in JP2015076970 provides for forming lamellar packs by means of adhesive which is applied on the single strips by means of spraying nozzles.

However, although effective in achieving the constraint between the strips such conventional methods for constraint between the strips for lamellar packs have some significant drawbacks for example due to the fact that the pack of strips may have fissures between one strip and the other due to an imperfect or non-optimal adhesion between and that they are responsible for the occurrence of undesired vibrations and noise.

Furthermore, such known assembly techniques by means of glue reveal some drawbacks lying in the fact that the nozzles or sprayers and, thus, the pumps for supplying them are often subject to maintenance (cleaning, failures and the like) and such operations require more or less prolonged downtime leading to, as a result, an increase in plant and production-related costs.

A further drawback, is represented by the fact that the known techniques that use sprayers introduce fluid dynamic parameters such as temperature, pressure, speed of flow of the glue in the sprayer nozzle, which have value throughout the lamellar pack assembly production process, in terms of cycle times and, thus, related costs.

The object of the present invention is to overcome the aforementioned drawbacks.

More particularly, the present invention relates to an apparatus for the assembly of lamellar packs for electrical use wherein such lamellar pack is made without using mechanical means such as, for example, bosses or similar retaining means.

SUMMARY

A further object of the present invention is to provide an apparatus for an improved assembly of lamellar packs by means of glue.

A further object of the present invention is to provide an assembly apparatus for lamellar packs so as to ensure a better electrical performance of the finished product (rotor, stator and the like defined by the lamellar packs).

A further object of the present invention is to provide an apparatus for the assembly of lamellar packs suitable for gluing strips both inside and outside the die for forming said strips.

A further object of the present invention is to provide an apparatus suitable to assemble lamellar packs in a quick and "clean" fashion.

A further object of the present invention is to provide an apparatus for the assembly of lamellar packs that is easy and simple to maintain.

A further object of the present invention is to provide the users with an apparatus for the assembly of lamellar packs for electrical use suitable to ensure a high resistance and reliability over time and, in addition, such to be easy and cost-effective to manufacture.

These and other objects are attained by the invention having the characteristics according to claim 1.

According to the invention, herein provided is an apparatus for the assembly of lamellar packs for electrical use in electric machines of the electric motor machines, generators, transformers, counters, ignition coils and similar electrical equipment by gluing, comprising a die-cutting station for the die-cutting of a sheet to define strips to be superimposed one on the other for forming the lamellar pack and a station for gluing—by means of glue—said strips cut from said sheet and characterised in that it comprises means for the discrete application of an amount of glue on a surface of the sheet and with said means operating synchronously with the forward movement of the sheet in the die-cutting station.

Advantageous embodiments of the invention are outlined by the dependent claims.

BRIEF DESCRIPTION OF THE DRAWINGS

The constructional and functional characteristics of the apparatus for the assembly of lamellar packs for electrical use of the present invention may be clearer from the detailed description that follows, in which reference will be made to the attached drawings which represent a preferred and non-limiting embodiment thereof and wherein.

DETAILED DESCRIPTION

Figure 1:
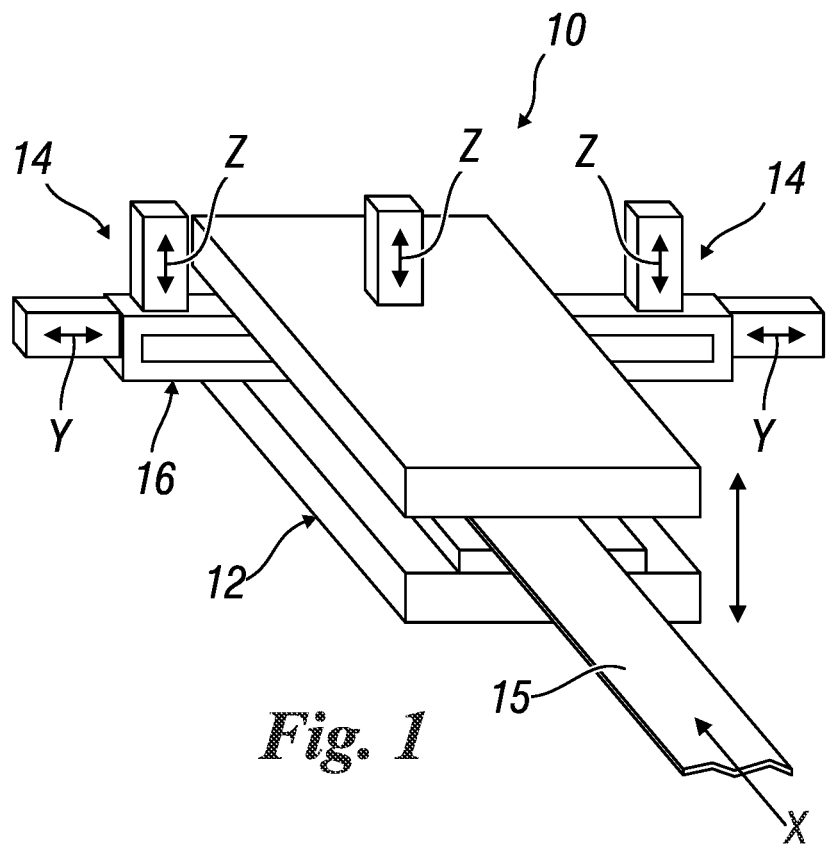
FIG. 1 represents a schematic axonometric view of a gluing station of the device for assembling lamellar packs of the invention.
Figure 2:
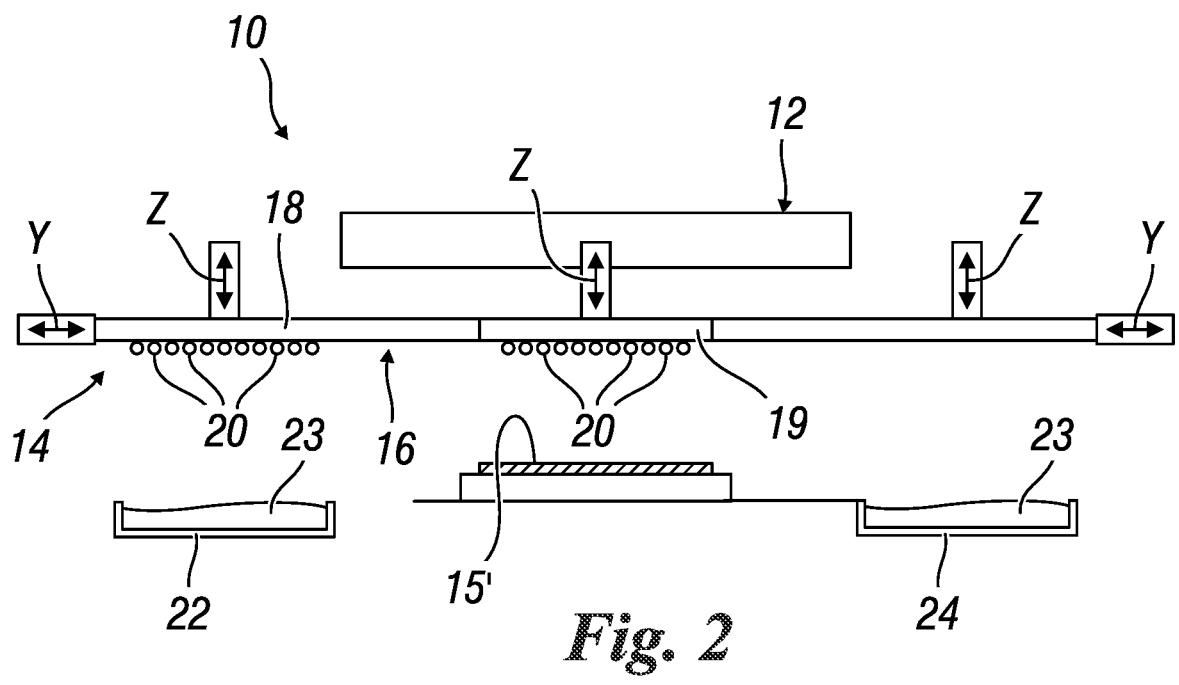
FIG. 2 represents a schematic front view of the gluing station according to FIG. 1 showing the displacement of the constituent components or forming elements.

With reference to the aforementioned figures, the apparatus for assembling lamellar packs of the present invention, indicated in its entirety with 10 in FIGS. 1 and 2, comprises a die-cutting station 12 and a station 14 for gluing the strips cut from a sheet 15 in the die-cutting station 12, with the sheet 15 displaced toward the die-cutting station 12 as indicated by the arrow X in FIG. 1.

In the preferred embodiment according to the figures, the gluing station 14 is arranged inside the die-cutting station 12; however, according to an alternative embodiment, the gluing station 14 can be arranged outside the die-cutting station 12 and this as a function of the production process requirements and/or as a function of the conditions around the cutting which will be better described hereinafter.

In the gluing station 14, whose characteristics and whose operation will be better described hereinafter, there is used (with reference to a preferred embodiment according to the mentioned figures) a two-component glue (component "A", i.e. the base of the glue) and a second component (component "B", i.e. the catalyst of the gluing reaction), comprising the first glue component (or component "A") which is sprayed onto the lower surface of the sheet by means of sprayers or rollers soaked or lubricated at the input of the cutting die or therein and with the second component (or component "B") applied onto the upper surface of the sheet as described below.

According to an embodiment alternative to the embodiment described above, the glue used for the assembly of the strips to define the lamellar pack is a glue of the single-component type; in this case, an amount of glue applied to the surface of the sheet as described below.

The gluing station 14 comprises a movable element 16 translating according to a lowering/lifting vertical direction (as indicated by the arrows Z in FIGS. 1 and 2) with respect to the sheet 15 (which moves forward in a direction X) and comprises at least one gluing unit for a preparation of glue on the strips to be stacked to define the lamellar pack.

The at least one gluing unit translates forward/backward horizontally (as indicated by the arrows Y in FIGS. 1 and 2) according to a direction perpendicular to the forward direction X of the sheet 15.

With specific reference to the embodiment according to the figures, the gluing station 14 comprises two gluing units defined by a first gluing unit 18 and by a second gluing unit 19 each provided with a plurality of pins 20 which, as better described hereinafter, are soaked in the glue (defined by component "B" or second component in the case of two-component glue) which is deposited on strips 15' cut from the sheet 15.

The forward/backward movement of the movable element 16 and the lowering/lifting movement thereof are carried out by means of conventional actuators of the pneumatic or hydraulic or electric type, with said movements being carried out simultaneously, i.e. the lowering/lifting of the gluing units 18 and 19 of the movable element 16 according to the direction Z occurs simultaneously with the forward/backward movement of the gluing units 18 and 19 according to the direction Y.

The gluing station 14 comprises at least one gluing reservoir and, with reference to the embodiment according to the figures, comprises a first gluing reservoir 22 and a second gluing reservoir 24 respectively containing an amount glue 23 (of the second component or component "B" in the case of two-component glue); it is to be understood that the number of gluing reservoirs corresponds to the number of gluing units.

The pins 20 (still with reference to the embodiment according to the figures) of the first gluing unit 18 and of the second gluing unit 19 are suitable to pick up the glue from the first 22 and from the second 24 gluing reservoir and to deposit it on the strips 15' of the sheet 15.

More particularly, the pins 20 have the function of picking up a drop 25 of glue and, to this end, they can have a tip or end (the end opposite to the fixing end with respect to the first and second gluing unit) with different configurations as a function of the type of glue to be used or the type of sheet or, in addition, the speed for cutting the sheet 15 and/or the conditions around the strips assembly process; therefore, the at least one gluing unit (the first and second gluing unit in the case of the embodiment according to the figures) defines a modular structure, considering that the number of pins 20 can be varied according to the specific production requirements of the lamellar packs.

Figure 4A:
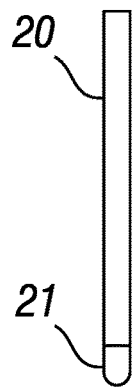
FIGS. 4A to 4C schematically represent different embodiments of a component of the apparatus of the invention.
Figure 4B:
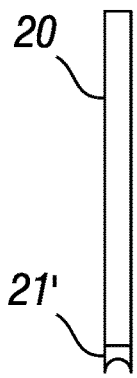
Figure 4C:
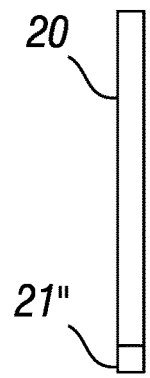

FIGS. 4A, 4B and 4C show three alternative configurations for the tip of the pin 20.

FIG. 4A shows a pin 20 with a convex tip 21.

FIG. 4B shows a pin with a concave tip 21'.

FIG. 4C shows a pin with a flat tip 21".

It should be observed that, in any case, the tip of the pin 20 may comprise different shapes (for example, truncated-cone or conical or with another more or less complex shape) according to the conditions outlined above.

The number of pins 20 of the at least one gluing unit is functional to the characteristics of the strips and the dimensional specifications thereof.

Furthermore, the pins 20 may comprise springing and damping means (not represented in the figure) with the function of ensuring optimum control of the deposition of glue on the strips.

Figure 5A:
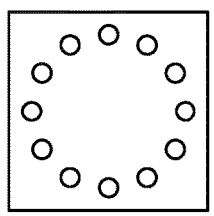
FIGS. 5A to 5C schematically represent three exemplary gluing configurations of the apparatus of the invention.
Figure 5B:
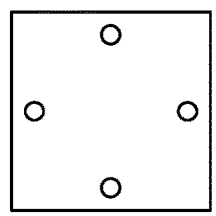
Figure 5C:
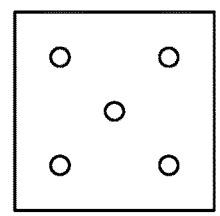

By way of example, FIGS. 5A to 5C represent three different types of arrangement of the pins 20 and, thus, of glue deposition.

FIG. 5A shows an arrangement according to a circumference, FIG. 5B illustrates a diamond or square arrangement and FIG. 5C illustrates an arrangement with "centred faces"; in any case other and different configurations are possible.

The operation of the apparatus for the assembly of lamellar packs of the invention, described above with reference to the constructional characteristics, is described below.

Figure 3:
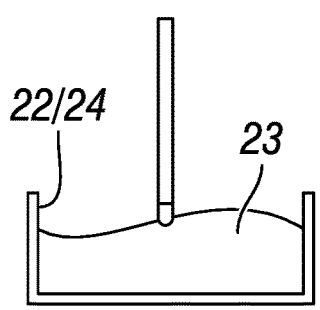
FIGS. 3 to 3C schematically represent a sequence of operating steps of the assembly apparatus of the invention.

With specific reference to FIG. 2 and to the preferred embodiment according to said figure, the first gluing unit 18 of the movable element 16 is moved downwards toward the first gluing reservoir 22 so as to allow the submersion of the pins in the glue 23 (second component or component "B" in the case of two-component glue) (FIG. 3) for picking up drops 25 of glue (FIG. 3A); a similar movement for picking up the glue also characterises the second gluing unit 19.

Figure 3A:
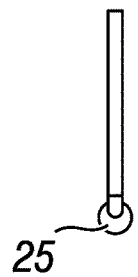
Figure 3B:
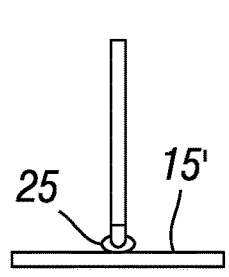
Figure 3C:
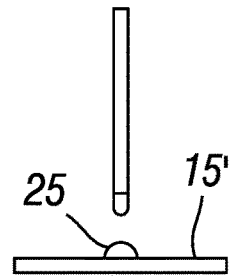

Subsequently, said first gluing unit is lifted and translated according to a horizontal direction at the sheet 15' cut from the sheet 15 and lowered in order to bring the pins 20 into contact with the surface of the strip (FIG. 3B) and release the drop 25 of glue 23 thereon (FIG. 3C).

While the first gluing unit 18 is lowered with the pins 20 at contact with the strip 15', the second gluing unit 19 is moved at the second gluing reservoir 24 so as to allow the submersion of the pins 20 into the glue (FIG. 3) for picking up drops 25 of glue 23 (FIG. 3A).

In addition to such operation, at the entrance of the die-cutting station 12 and in the case of use a two-component glue, an amount of glue (first component "A" in the case of two-component glue) is sprayed, by means of sprayers/rollers, onto the sheet at the lower surface thereof, on the opposite side with respect to that of depositing the drops of glue 23 on the upper surface of the strip.

In the case of use of a single-component glue, such step of spraying the glue by means of sprayers/rollers is not carried out.

The second gluing unit 19 is then lifted and translated toward the strip 15' (a subsequent strip) cut from the sheet 15 and lowered toward said strip so as to deposit the drops of glue on the surface thereof; such movements occur synchronously with the forward movement of the sheet metal in the cutting station.

At the same time, the first gluing unit is moved toward the first gluing reservoir for a new pick up of glue (second component) by the pins 20.

Therefore, the operations of picking up the glue and depositing it on the strips occur in so-called "masked time" without interruptions in the working cycle; actually, a step of depositing the glue on a strip by a gluing unit corresponds to a simultaneous pick up of glue by another gluing unit.

Once a lamellar pack has been completed as described above, in order to differentiate one lamellar pack from the subsequent one, the end pack is realized by not moving the gluing station 14 over the sheet and/or by deactivating the sprayers/rollers that deposit the glue (the first component or component "A") or the movement of the pins is deactivated in the case of a single-component glue; subsequently, the creation of the new lamellar pack starts as described above.

It is also clear that a similar movement occurs in the case of a single gluing unit or of more gluing units (three or more).

The advantages attained by the apparatus of the invention is observable in the light of the above.

The apparatus for the assembly of lamellar packs of the invention advantageously allows to perform the assembly by packing the strips cut from a sheet by means of glue and without using pumps and nozzles, but by means of mechanical pins which do not require maintenance such as nozzles and pumps and this results in a reduction in machine downtime and, consequently, in a reduction in production times and related costs.

A further advantage of the apparatus of the invention lies in the fact that the application of glue by means of the and, more particularly, the deposition of drops of glue on the surface of the strips, defines a very clean and localised gluing mode, unlike conventional gluing techniques in which the glue is sprayed onto the surface of the strips.

A further advantage of the apparatus of the invention lies in the fact that the use of pins suitable for the deposition of drops of glue on the surface of the strips, without requiring the use of nozzles, pumps and systems for controlling the flow of glue, entails costs much lower than the conventionally known gluing techniques.

Furthermore, a further advantage of the invention lies in the fact of not using nozzles and/or sprayers, is not constrained to the corresponding fluid-dynamic parameters (such as, for example, the glue pressure, the glue temperature, the nozzle cleaning, etc.) and, thus, is a faster gluing technique (the glue of the apparatus of the invention being housed in reservoirs is in a static condition); as a matter of fact, in the event of wear or breakage of the pins, it is sufficient to replace them (an easy and rapid operation characterised by very low costs in relation to the costs and at replacement times of the conventional spray nozzles).

A further advantage lies in the fact that, as described, the gluing units are of the modular type (with the possibility of varying the number and arrangement of the pins according to the specific production requirements) and this allows an easy assembly of the apparatus both inside and outside the die-cutting station (for example, an assembly outside the die-cutting station) as a function of the overall dimensions of the latter (die-cutting station too large or too small).

Although the invention has been described above with particular reference to an embodiment thereof provided solely by way of non-limiting example, various modifications and variations will be apparent to a man skilled in the art in the light of the description above. Thus, the present invention intends to embrace all the modifications and variations which fall within the scope of protection of the claims that follow.

The invention claimed is:

1. An apparatus (10) for assembly of lamellar packs for electrical use in electric motor machines, generators, transformers, counters, ignition coils and electrical equipment with gluing means, comprising:
   a die-cutting station (12) for die-cutting a sheet (15) to define strips (15') to be superimposed one on an other for forming a lamellar pack; and
   a gluing station (14) for gluing by means of glue said strips (15') cut from said sheet (15) and wherein the gluing station comprises means for discretely applying an amount of glue on an upper surface of the sheet (15) comprising a movable element (16) translating according to a lowering/lifting vertical direction with respect to the sheet (15) for a displacement of at least one gluing unit (18, 19) stabilised on said movable element (16) and provided with gluing means comprising a plurality of pins (20) suitable to pick up the amount of glue in the form of drops (25) from at least one gluing reservoir (22, 24) of the gluing station (14) containing the amount of glue (23), with said at least one gluing unit (18, 19) being translatable forward/backward according to a horizontal plane in a direction perpendicular to an advancement direction of the sheet (15) in the die-cutting station (12), a displacement of the movable element (16) and the displacement of the at least one gluing unit being synchronous with an advancement movement of the sheet (15) in the die-cutting station (12), operations of picking up the glue and depositing the glue on the strips occurring without interruptions in a working cycle with the lowering/lifting translation movement of the at least one gluing unit (18, 19) toward the at least one gluing reservoir (22, 24) corresponding to a simultaneous and synchronous lowering/lifting translation movement of another gluing unit displaced toward the sheet (15) for depositing the drops (25) thereon.

2. The apparatus according to claim 1, wherein the pins (20) comprise springing and damping means for controlling the deposition of the drops (25) of glue on the strips (15').

3. The apparatus according to claim 1, wherein an end of at least one of the pins (20) opposite to a stabilized end of the at least one pin with respect to the at least one gluing unit comprises a convex tip (21).

4. The apparatus according to claim 1, wherein an end of at least one of the pins (20) opposite to a stabilized end of the at least one pin with respect to the at least one gluing unit comprises a concave tip (21').

5. The apparatus according to claim 1, wherein an end of at least one of the pins (20) opposite to a stabilized end of the at least one pin with respect to the at least one gluing unit comprises a flat tip (21").

6. The apparatus according to claim 1, wherein the gluing station (14) is arranged inside the die-cutting station (12).

7. The apparatus according to claim 1, wherein the gluing station (14) is arranged outside the die-cutting station (12).

8. The apparatus according to claim 1, wherein the glue is of the single-component type.

9. The apparatus according to claim 1, wherein the glue is of the two-component type comprising a first component defining the base of the glue and a second component defining a catalyst of a gluing reaction.

10. The apparatus according to claim 1, wherein the gluing station (14) comprises two gluing units including a first gluing unit (18) and a second gluing unit (19) each provided with a plurality of pins (20) and a first gluing reservoir (22) and a second gluing reservoir (24) respectively containing an amount of glue (23).

* * * * *